United States Patent
Dash et al.

(10) Patent No.: US 10,271,376 B2
(45) Date of Patent: Apr. 23, 2019

(54) OPTIMIZED TRANSMISSION FOR PRIORITY DATA ON A RADIO ACCESS TECHNOLOGY NETWORK

(71) Applicant: Intel IP Corporation, Santa Clara, CA (US)

(72) Inventors: Deepak Dash, Khordha (IN); Nitin Kuppelur, Bangalore (IN)

(73) Assignee: INTEL IP CORPORATION, Santa Clara, CA (US)

(*) Notice: Subject to any disclaimer, the term of this patent is extended or adjusted under 35 U.S.C. 154(b) by 93 days.

(21) Appl. No.: 15/279,463

(22) Filed: Sep. 29, 2016

(65) Prior Publication Data

US 2018/0092135 A1    Mar. 29, 2018

(51) Int. Cl.
| | | |
|---|---|---|
| H04W 76/00 | (2018.01) | |
| H04W 76/50 | (2018.01) | |
| H04W 76/18 | (2018.01) | |
| H04W 76/10 | (2018.01) | |
| H04W 4/90 | (2018.01) | |
| H04W 80/04 | (2009.01) | |
| H04W 84/00 | (2009.01) | |

(52) U.S. Cl.
CPC ............ H04W 76/50 (2018.02); H04W 4/90 (2018.02); H04W 76/10 (2018.02); H04W 76/18 (2018.02); H04W 80/04 (2013.01); H04W 84/00 (2013.01)

(58) Field of Classification Search
CPC ............... H04B 7/2121; H04B 7/2123; H04J 2203/0069; H04Q 2213/394; H04W 72/04; H04W 72/12; H04W 76/00; H04W 36/0022; H04W 36/14; H04W 76/20; H04W 76/04

USPC .......................................................... 370/329
See application file for complete search history.

(56) References Cited

U.S. PATENT DOCUMENTS

| | | | | |
|---|---|---|---|---|
| 7,835,293 B2 * | 11/2010 | Cidon | ................. | H04L 12/2697 370/248 |
| 8,213,454 B2 * | 7/2012 | Insler | ...................... | H04L 47/10 370/237 |
| 8,553,567 B1 * | 10/2013 | Anderson | ............... | H04L 47/32 370/243 |
| 2004/0266427 A1 * | 12/2004 | Kurokawa | ............ | H04W 88/08 455/426.2 |
| 2008/0102784 A1 * | 5/2008 | Mittal | .................... | H04M 11/04 455/404.1 |

(Continued)

Primary Examiner — Robert J Lopata
(74) Attorney, Agent, or Firm — Viering, Jentschura & Partner mbB (57) ABSTRACT

Delay in IMS call establishment and other time critical data transfers may be reduced by seeking alternative transmission methods for time critical data, when a transmission cannot be completed or the Radio Access Technology is otherwise unavailable. A Critical Service Manager ("CSM") receives and evaluates priority information about a given data transfer. By evaluating this priority information, the CSM can identify priority data, or latency intolerant data, such as IMS calls or emergency calls. Where network rejects a connection request and issues a wait timer, the CSM may lower the retransmission count to hasten a permanent transmission failure. Upon a permanent transmission failure, the CSM can determine an alternative protocol for transmission of the priority data, such as transmitting data through circuit switch fallback, via Wi-Fi, or through another legacy RAT.

24 Claims, 8 Drawing Sheets

(56) References Cited

U.S. PATENT DOCUMENTS

| | | | |
|---|---|---|---|
| 2008/0311881 A1* | 12/2008 | Taaghol | H04L 67/14 455/404.2 |
| 2009/0228755 A1* | 9/2009 | Franovici | H04L 1/1816 714/751 |
| 2010/0210282 A1* | 8/2010 | Ventulett | H04M 11/04 455/456.1 |
| 2010/0255826 A1* | 10/2010 | Brewer | H04W 4/10 455/414.1 |
| 2010/0284364 A1* | 11/2010 | You | H04L 1/1887 370/330 |
| 2011/0310797 A1* | 12/2011 | Kobayashi | H04L 1/1887 370/328 |
| 2012/0026942 A1* | 2/2012 | Goto | H04L 1/1822 370/328 |
| 2012/0106458 A1* | 5/2012 | Jang | H04W 76/027 370/328 |
| 2012/0156985 A1* | 6/2012 | Li | H04W 72/10 455/8 |
| 2013/0040557 A1* | 2/2013 | Shiizaki | H04B 7/15507 455/7 |
| 2013/0078941 A1* | 3/2013 | Moisanen | H04W 24/00 455/404.2 |
| 2013/0235719 A1* | 9/2013 | Ekici | H04W 28/0289 370/229 |
| 2014/0003354 A1* | 1/2014 | Ekici | H04W 76/19 370/329 |
| 2014/0024331 A1* | 1/2014 | Hsu | H04W 4/90 455/404.1 |
| 2015/0237469 A1* | 8/2015 | Stephens | H04L 65/10 455/404.2 |
| 2016/0072929 A1* | 3/2016 | Alsup | H04L 12/40156 370/392 |
| 2016/0095046 A1* | 3/2016 | Tervonen | H04W 48/14 370/338 |
| 2017/0013616 A1* | 1/2017 | Wentink | H04W 72/0446 |
| 2017/0041243 A1* | 2/2017 | Nakayasu | H04L 12/4625 |
| 2017/0180486 A1* | 6/2017 | Mehta | H04W 4/90 |
| 2017/0230895 A1* | 8/2017 | Zhang | H04W 76/18 |
| 2017/0245178 A1* | 8/2017 | Nobukiyo | H04W 28/14 |
| 2017/0273118 A1* | 9/2017 | Hasegawa | H04W 76/10 |

* cited by examiner

OPTIMIZED TRANSMISSION FOR PRIORITY DATA ON A RADIO ACCESS TECHNOLOGY NETWORK

TECHNICAL FIELD

Embodiments described herein generally relate to the transmission of IP Multimedia Subsystem data.

BACKGROUND

In systems with multi-layered architecture, such as a system under the Open Systems Interconnection Model ("OSI"), where data transfer occurs in packets, data link layers such as Radio Link Control ("RLC") and Medium Access Control ("MAC") are not aware of the type of data being transmitted. Thus, even for IP Multimedia Subsystem ("IMS") and other high priority data, data link layers follow the normal retransmission mechanisms. Yet, some data is time critical. For more time critical data, such as IMS call establishment, use of the normal retransmission mechanisms can lead to delay in call establishment, poor user experience, or call failure.

In circumstances where the Radio Access Technology ("RAT") is unavailable for transmission of time critical data, the data plane bearers will generally not be advised about the unavailability of the RAT, and they will continue to attempt retransmissions to the physical layer. This results in repeated retransmission attempts, which can result in unacceptable latency for time critical data.

SUMMARY

Delay in IMS call establishment and other time critical data transfers may be reduced by seeking alternative transmission methods for time critical data, when the RAT is otherwise unavailable. To evaluate the priority of a given data transfer, a Critical Service Manager ("CSM") is utilized to receive and evaluate priority information about a given data transfer. The priority information comprises information received from elements of layers 2 and 3, as well as information received from other packet scheduling modules and applications. By evaluating this priority information, the CSM can identify priority data, where the successful transmission of said data is time critical.

When a network rejects a connection request to transmit priority data, the CSM can implement an alternative protocol for transmission of the priority data. The alternative protocol may include transmitting data through Circuit Switched Fall Back ("CSFB"), via Wi-Fi, or through another legacy RAT. Alternatively, the critical service manager may order further retransmission attempts over the LTE network, whether immediately or upon expiration of a wait timer.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects are described with reference to the following drawings, in which.

DESCRIPTION OF EMBODIMENTS

The following detailed description refers to the accompanying drawings that show, by way of illustration, specific details and aspects of this disclosure in which the Disclosure may be practiced. Other aspects may be utilized, and structural, logical, and electrical changes may be made without departing from the scope of the Disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, General Packet Radio Service (GPRS), Enhanced Data Rates for GSM Evolution (EDGE), High Speed Packet Access (HSPA), HSPA Plus (HSPA+), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network. Unless explicitly specified, the term "transmit" encompasses both direct and indirect transmission. Similarly, the term "receive" encompasses both direct and indirect reception unless explicitly specified.

Figure 1:
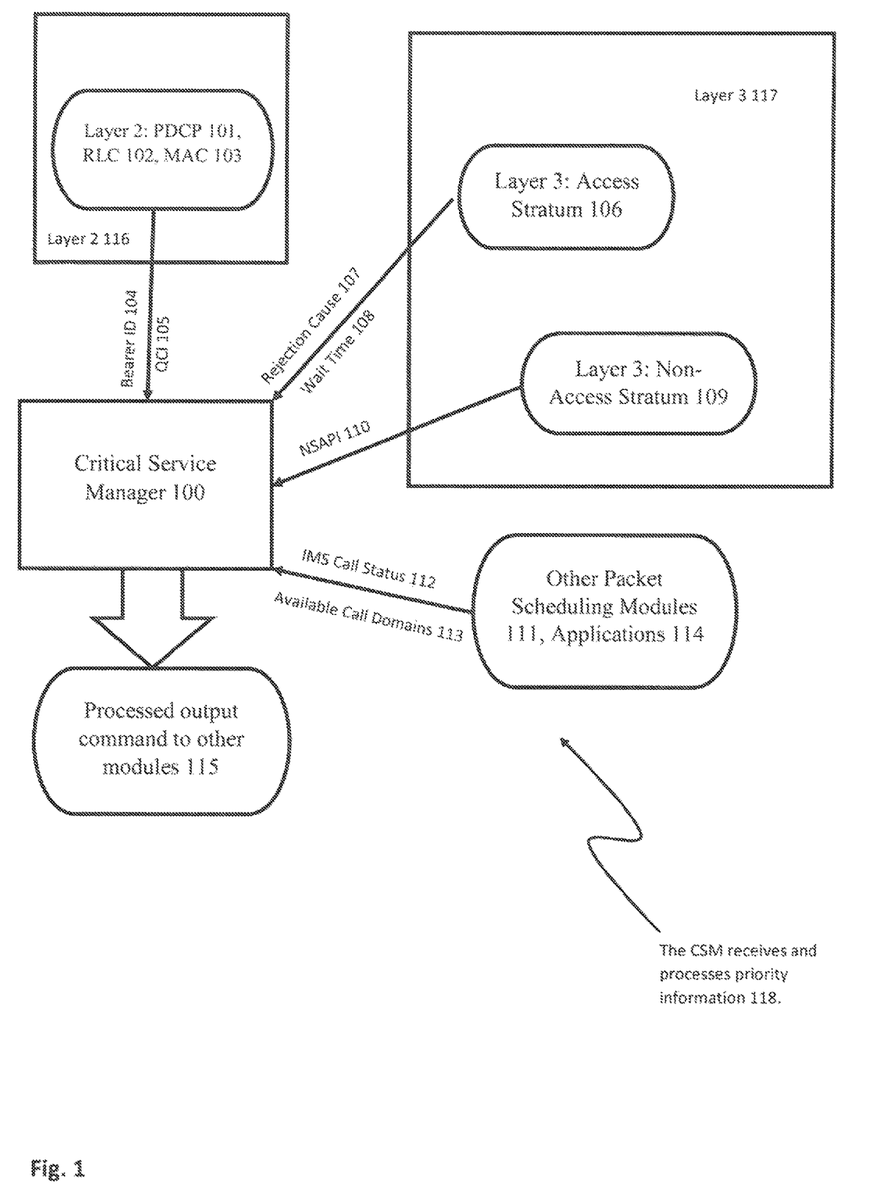
FIG. 1 shows the CSM collecting priority information.

In FIG. 1, the CSM 100 is depicted as receiving data known as priority information from a variety of sources within Layer 2 and Layer 3. The Packet Data Convergence Protocol ("PDCP") 101, the RLC 102, and the MAC 103 provide priority information to the CSM 100, such as the Bearer ID 104 and Quality of Service Class Identifier ("QCI") 105. The Access Stratum ("AS") 106 provides priority information to the CSM 100, such as the rejection cause 107 and wait time 108. The Non-Access Stratum ("NAS") 109 provides priority information to the CSM 100, such as the Network Service Access Point Identifier ("NSAPI") 110, which identifies the caller. Other Packet Scheduling Modules ("PS Modules") 111 provide priority information to the CSM 100, such as the IMS Call Status 112 and the Available Call Domains 113. Applications 114 may also provide priority information to the CSM 100.

The CSM 100 processes the priority information obtained from the various modules and issues output commands 115. The PDCP 101, RLC 102, and MAC 103 are located in layer 2 116. The AS 106 and NAS 109 are located in layer 3 117. This information received by the CSM, and which the CSM evaluates to determine the priority level of a transmission, is generally understood to be priority information 118.

Figure 2:
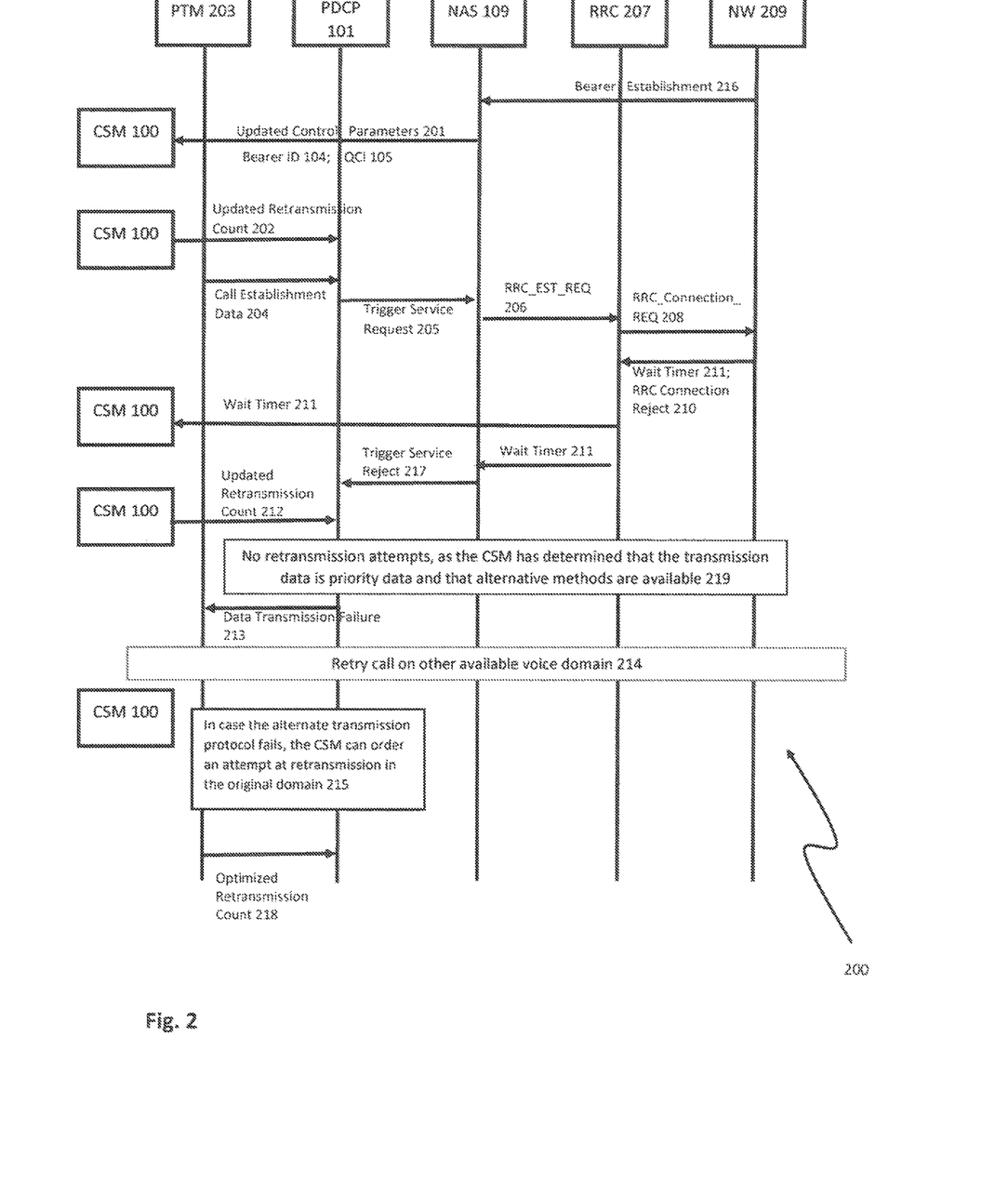
FIG. 2 shows a method of using the CSM to attempt transmission of priority data in light of a transmission rejection.

FIG. 2 shows a procedure of managing priority transmission 200. In FIG. 2, upon an initial connection, the bearer establishment 216 information is transmitted, where the bearer refers to packet flows that receive a common Quality of Service treatment. The CSM 100 receives priority information in the form of Updated Control Parameters 201, comprising Bearer ID 104, QCI 105, Rejection Cause 107, Wait Timer 108, NSAPI 110, IMS Call Status 112, and any information received generally from the PDCP 101, RLC 102, MAC 103, AS 106, NAS 109, Other PS Modules or Applications 114. The CSM 100 assesses this information to determine whether a data in a transmission is priority data. Priority data will be discussed in detail; however, priority data should generally be understood to mean data of a high priority. Alternatively, priority data may be understood to mean data with a comparatively low tolerance for latency.

Based on the determination of whether data in a transmission is priority data, the CSM may output an Updated Retransmission Count 202, which may be an integer, and in the case of priority data, may be a lower integer than the prior retransmission count, so as to more rapidly reach a transmission failure. For example, where the Updated Retransmission Count 202 is changed to zero, a permanent transmission failure will be deemed to have occurred after the first transmission rejection 219, thereby foreshortening the usual pattern of performing multiple retransmission attempts, with the end goal of reducing latency in the transmission.

The Point-to-Multipoint ("PTM") 203 relays to the PDCP 101 the IMS Call Establishment Data 204. The PDCP then transmits a Trigger Service Request 205 to the NAS 109. The NAS transmits a Radio Resource Control Establishment Request ("RRC_EST_REQ") 206 to the Radio Resource Control ("RRC") 207. The RRC 207 transmits a Radio Resource Control Connection Request ("RRC CONNECTION REQ") 208 to the Network 209.

Where the Network 209 cannot accept the RRC CONNECTION REQ 208, the Network 209 responds with a Radio Resource Control Connection Rejection ("RRC CONNECTION REJ") 210. The RRC CONNECTION REJ 210 may contain a Wait Timer 211, which specifies a length of time that the network will reject an RRC CONNECTION REQ 208. The RRC CONNECTION REJ 210 and the Wait Timer 211 are transmitted to the CSM 100. In response to the RRC CONNECTION REJ 210, the CSM 100 may reduce the retransmission count to a lower integer or set the retransmission count to zero 212. In response to the failed transmission with a retransmission count of zero, there may be retransmission failure 213. The CSM 100 may issue a command to retry the IMS transmission on an alternative domain 214. Where alternative methods do not work or are unavailable, the CSM 100 may issue an order to retry the IMS transmission in the original domain 215. Where the priority data transmission is being reattempted on the original domain, the CSM may issue a revised or optimized retransmission count 218, which may be any integer, and which may be increased to prevent a rapid permanent transmission failure where no suitable alternative methods of transmission are available. The wait timer 211 is communicated from the NAS 109 to the PDCP 101 as a Trigger Service Reject 217.

Figure 3:
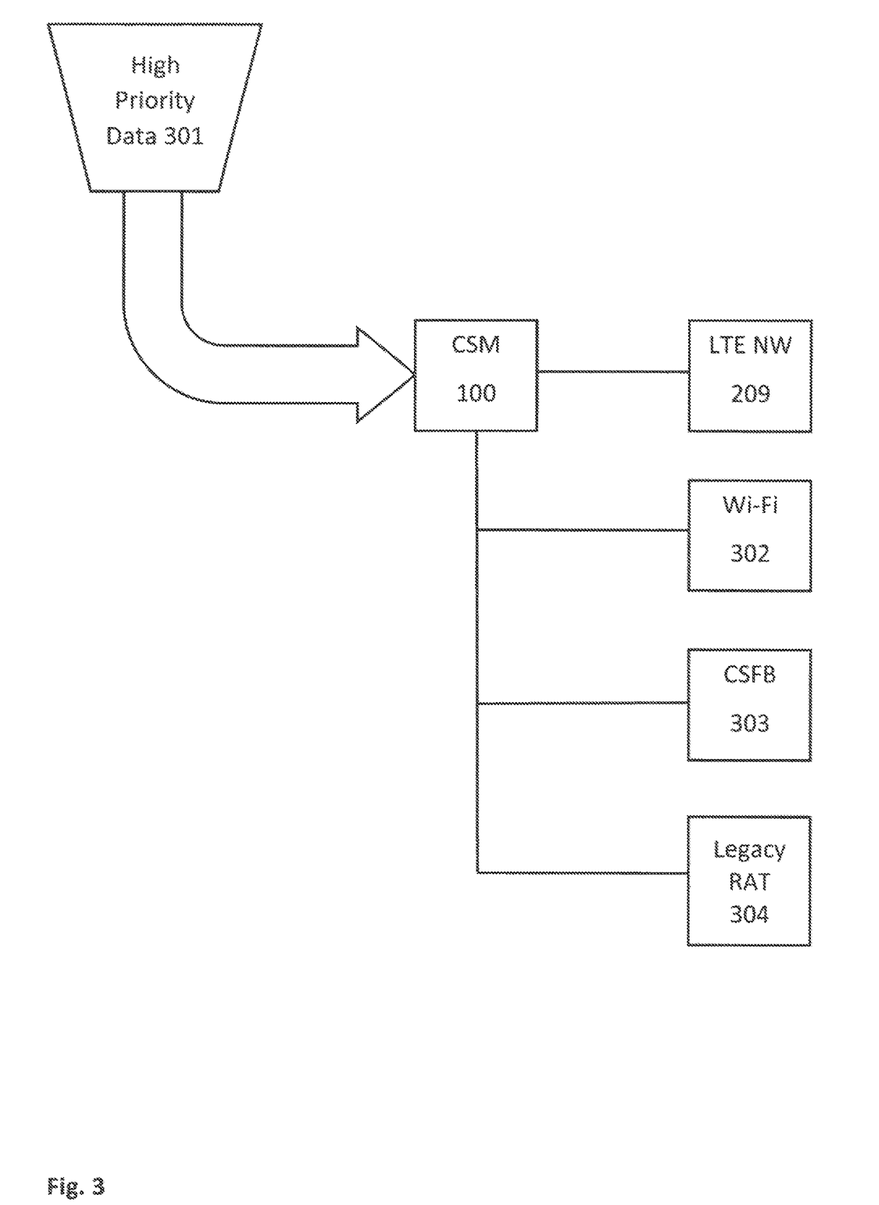
FIG. 3 shows the CSM rerouting high priority data through alternative transmission processes.

FIG. 3 shows a CSM 100 selecting an alternative means to transmit high priority data 301. In an LTE network 209 (also referred to as "network"), high priority data 301 is typically transmitted through the LTE network 209. However, in situations where the network 209 is unavailable, the CSM 100 may determine an alternative method of transmitting the high priority data 301 during the period when the network 209 is unavailable, whether due to congestion, or overload, or otherwise. Alternative methods of transmission may comprise, but are not limited to, a Wi-Fi connection 302, a CSFB 303, or any legacy RAT connection 304. The CSM 100 may order that efforts to transmit the priority data 301 cease, and that the priority data be transmitted through alternative method instead. When the network becomes available once again, the CSM 100 may order that priority data 301 again be transmitted through the network 209. During a period where priority data 301 is transmitted via an alternative method, such as Wi-Fi 302, CSFB 303, or Legacy RAT 304, and the alternative method becomes unavailable or undesirable, the CSM 100 can route the priority data 301 to a different, available, alternative method of transmission.

Figure 4:
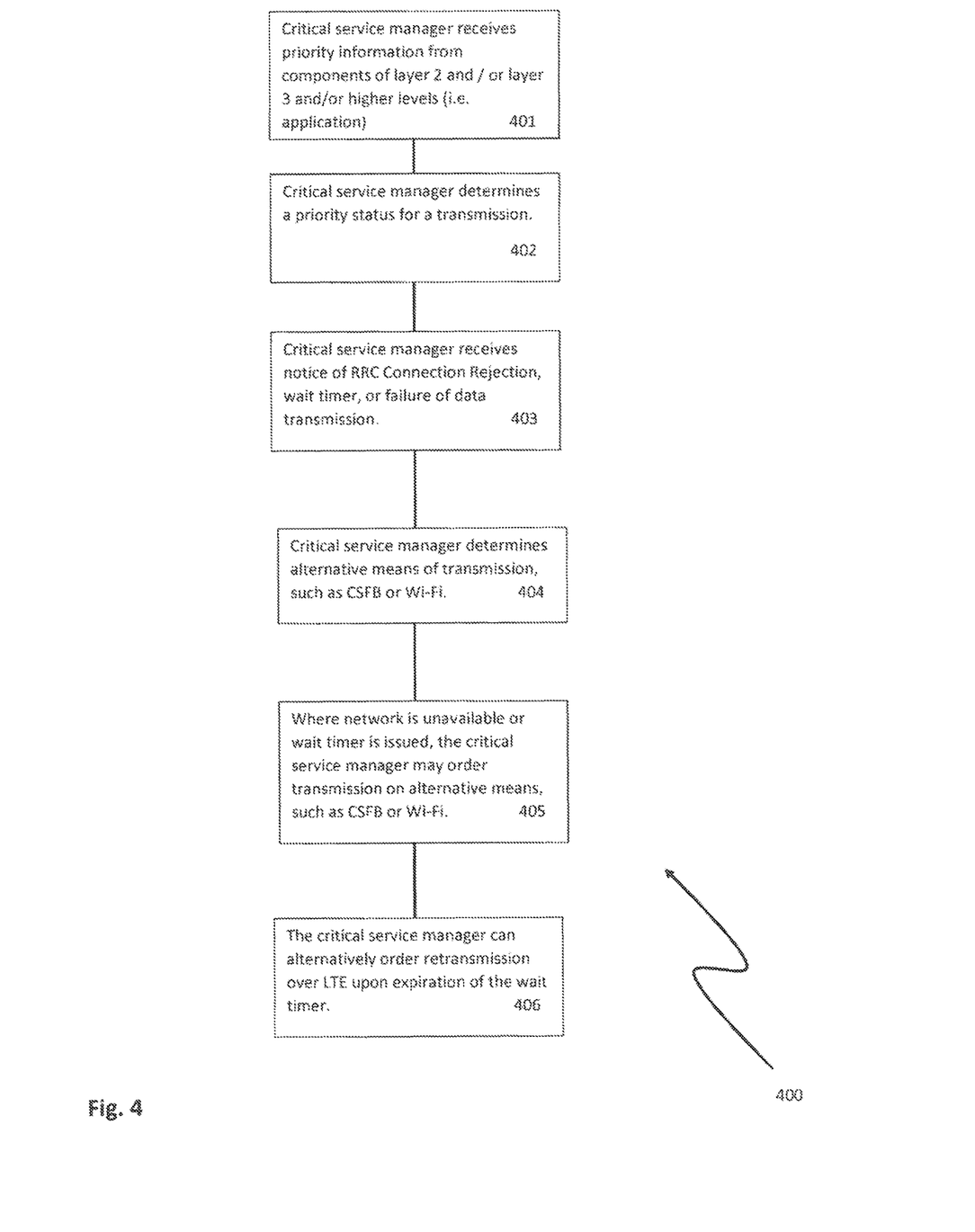
FIG. 4 shows a method for a CSM to evaluate data priority and transit priority data according to an alternative transmission process.

FIG. 4 shows a method for a CSM to evaluate data priority and transmit priority data according to an alternative transmission process 400 comprising the CSM receiving priority information from components of layer 2 and/or layer 3 and/or higher levels (i.e. application) 401; the CSM determining a priority status for a transmission 402; the CSM receiving notice of RRC Connection Rejection, wait timer, and/or failure of data transmission 403; the CSM determining alternative means of transmission such as CSFB or Wi-Fi 404; where the network is unavailable or wait timer is issued, the CSM may order transmission on alternative means, such as CSFB or Wi-Fi 405; or the CSM may alternatively order transmission over LTE upon expiration of the wait timer 406.

Figure 5:
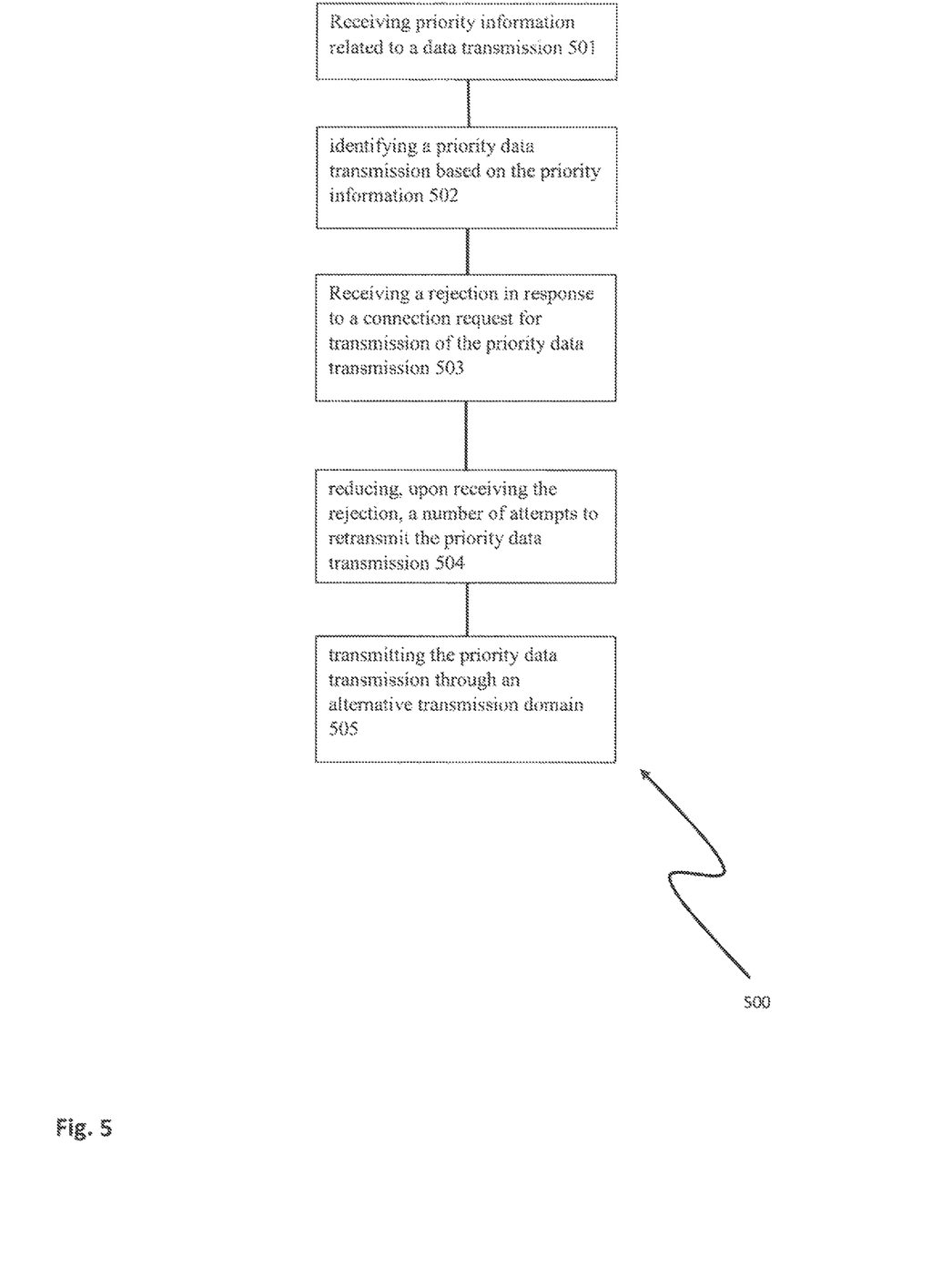
FIG. 5 shows a first method of data transfer over a wireless mobile network.

FIG. 5 shows a first method of data transfer over a wireless mobile network 500 comprising receiving priority information related to a data transmission 501; identifying a priority data transmission based on the priority information 502; receiving a rejection in response to a connection request for transmission of the priority data transmission 503; reducing, upon receiving the rejection, a number of attempts to retransmit the priority data transmission 504; and transmitting the priority data transmission through an alternative transmission domain 505.

Figure 6:
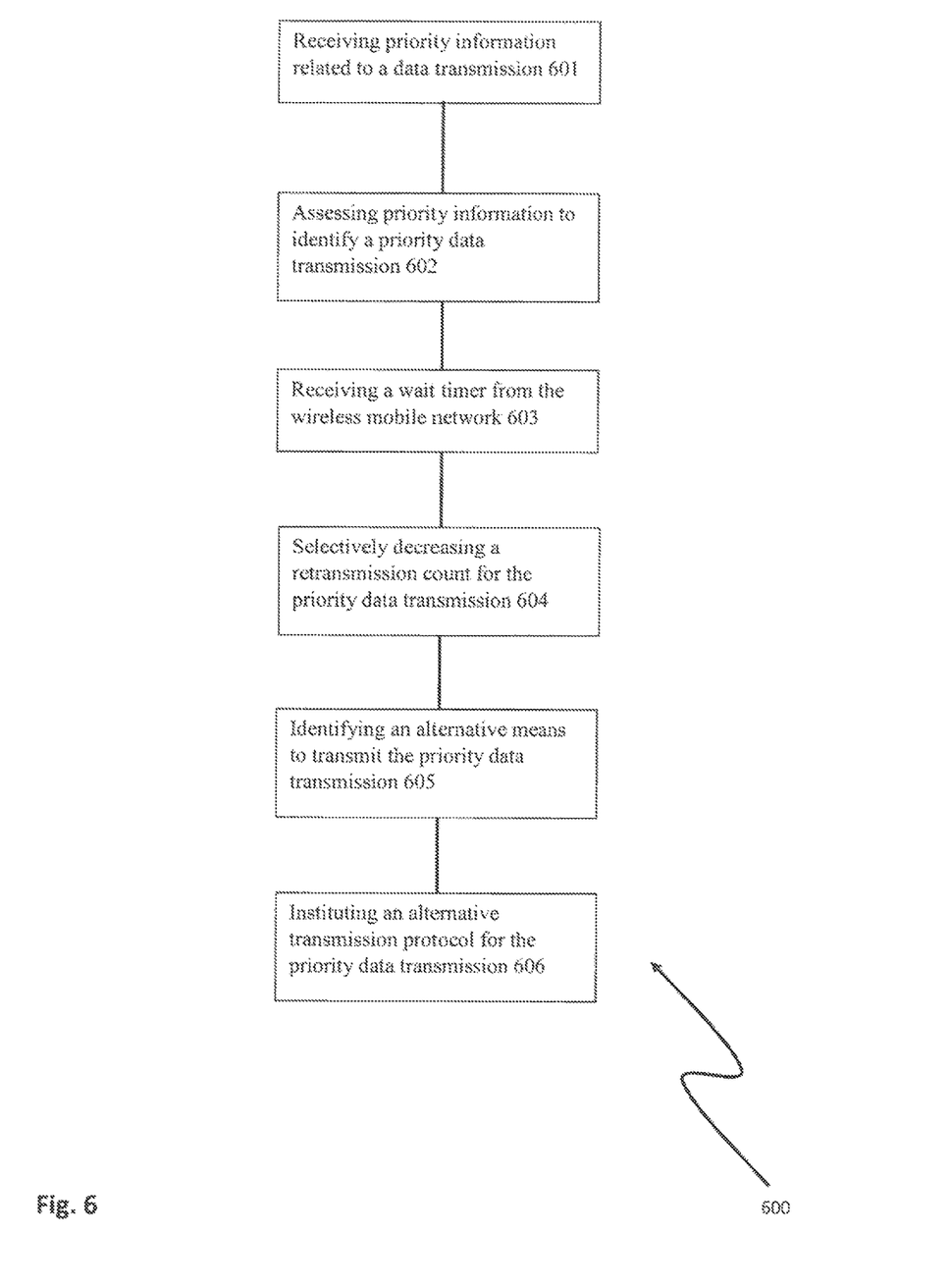
FIG. 6 shows a second method of data transfer over a wireless mobile network.

FIG. 6 shows a second method of data transfer over a wireless mobile network 600 comprising receiving priority information related to a data transmission 601; assessing priority information to identify a priority data transmission 602; receiving a wait timer from the wireless mobile network 603; selectively decreasing a retransmission count for the priority data transmission 604; identifying an alternative means to transmit the priority data transmission 605; and instituting an alternative transmission process for the priority data transmission 606.

Figure 7:
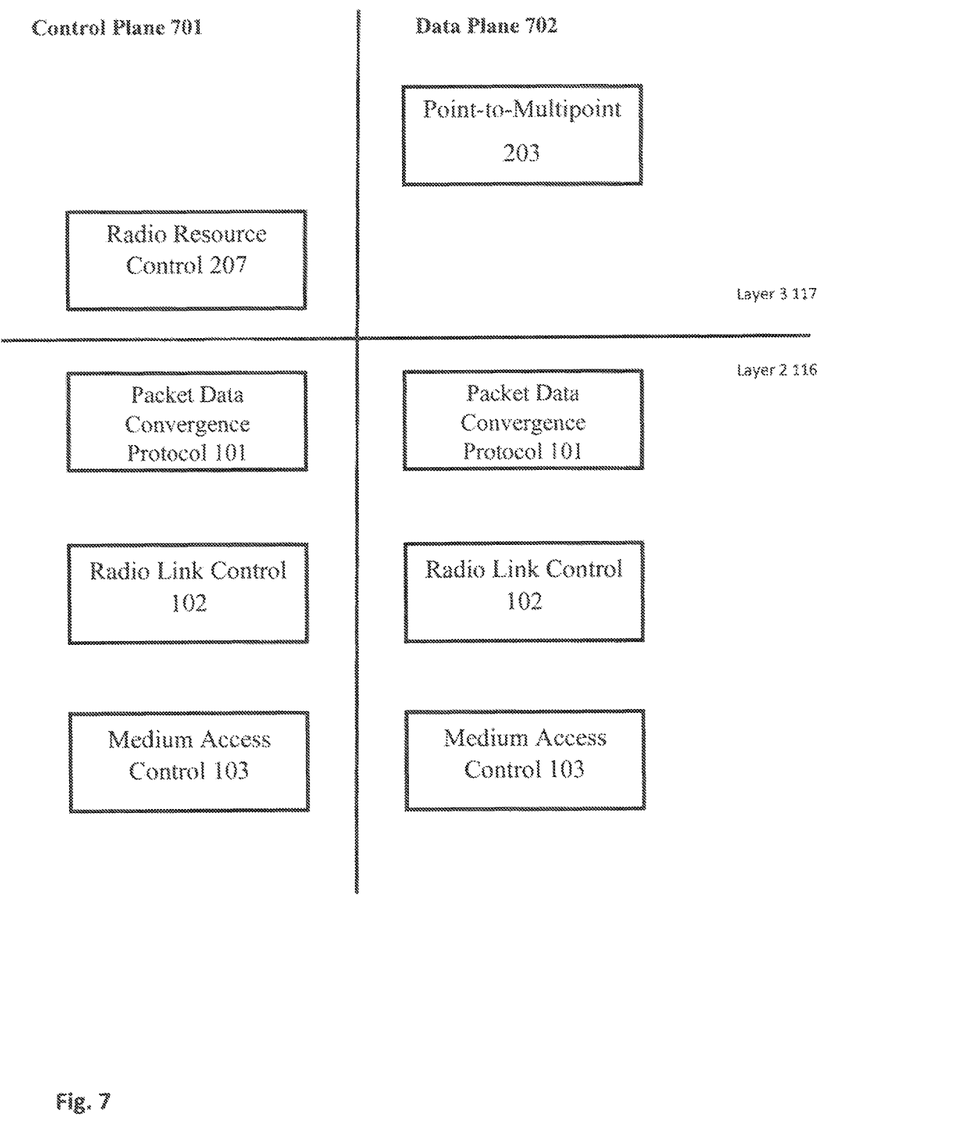
FIG. 7 shows elements utilized in the transmission of data, as divided into a control plane and data plane, and into layer 2 and layer 3.
Figure 8:
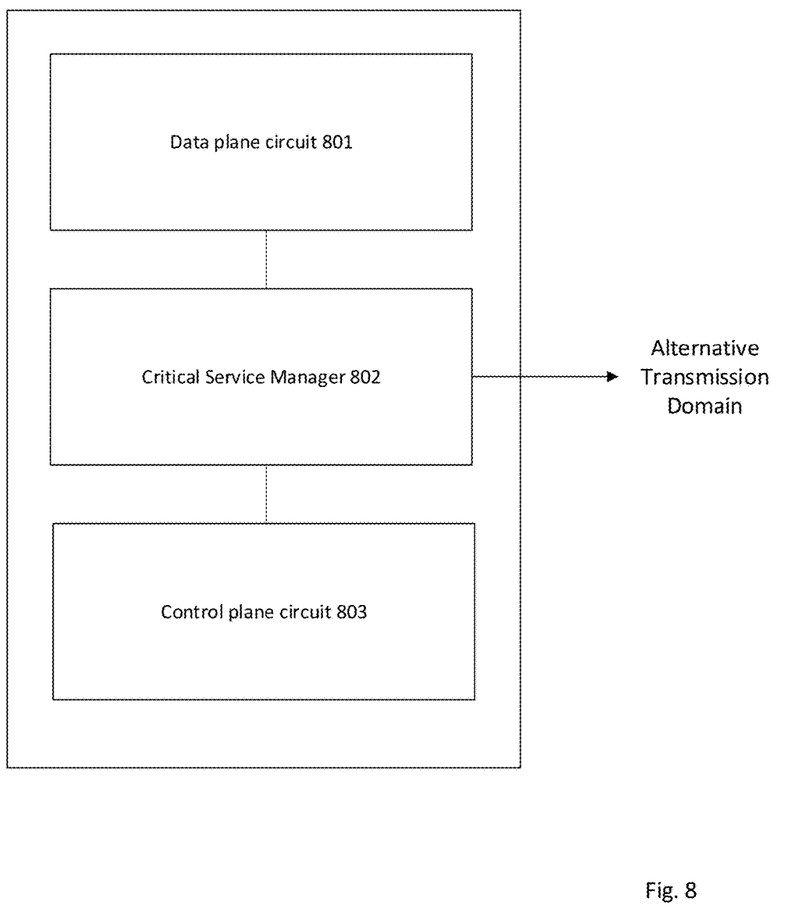
FIG. 8 shows an apparatus for data transfer over wireless mobile network.

FIG. 7 shows a configuration of various elements related to the CSM's assessment of priority information and handling of data transmission. From left to right, FIG. 7 shows the division of the various elements into the control plane 701 and the data plane 702, while demonstrating the elements that share both the control plane 701 and the data plane 203. The control plane 701 comprises the RRC 207, PDCP 101, RLC 102, and MAC 103. The data plane 702 comprises the PTM 203, PDCP 101, RLC 102, and MAC 103. From top to bottom, FIG. 7 also designates layer 2 116 and layer 3 117. As shown in this figure, layer 2 comprises the PDCP 101, RLC 102, and MAC 103, whereas layer 3 comprises the RRC 207 and PTM 203.

This is a method of optimizing transmission of priority data over a radio access technology network, such as an LTE network. Such priority data may comprise IMS data that has a low tolerance for latency, such as Voice Over LTE ("VoLTE") calls. It may also comprise data of particular importance, such as emergency calls, or data that has otherwise been deemed as high priority data, whether by an application or otherwise. The CSM 100 gathers a variety of information, generally referred to here as "priority information," from various modules to assess the priority of data to be transferred from UE. The CSM 100 can obtain information from layer 2 116 and layer 3 117. The second layer may comprise PDCP 101, RLC 102, MAC 103, or information such as bearer ID 104, or QCI 105. Layer 3 may comprise access spectrum data 106, which itself may comprise the rejection cause 107 and wait time 108. Layer 3 may also comprise the non-access spectrum data 109, which may provide, for example, NSAPI 110. The CSM 100 may also obtain information from UE applications 114 and other PS modules 111, as well as IMS call status data 112 and available call domains 113. The CSM 100 reviews the received information and assigns a priority to the data to be transmitted. This priority assessment could be binary, where data is assessed as being priority data or non-priority data. Alternatively, there can be multiple levels of priority, ranging from non-priority to high priority. The UE issues an RRC connection Request 208 to connect to the network and transmit the priority data.

In a modern digital network, a variety of data-types can be transmitted. This data may comprise the results of a web-browser search, application-specific data, an emergency call, a voice call, or otherwise. Whereas brief periods of latency may be acceptable for some types of data transmissions, other types of data are particularly sensitive to even brief latency. Such data are generally referred to herein as priority data.

For example, IMS Voice calls may be considered priority data. Where an IMS voice call is transmitted, the call is transmitted in data packets, which, once received, are then played as a single voice stream. Because of the nature of a voice conversation, there is a limited tolerance for latency in transmission of IMS voice calls. Latency in data packet transmission exceeding a threshold can result in a voice call that contains unwanted pauses or other flaws that result in decreased user satisfaction. Such pauses or other flaws can render a voice conversation unacceptable. Furthermore, latency exceeding a threshold may result in call drop, which further decreases user satisfaction and reduces the overall usefulness of the network. Application-specific data may be considered priority data where so prompted by an application. Emergency calls, by their very nature of being related to an emergency, may be considered priority data.

LTE network readiness for data transmission cannot be guaranteed. Various factors may result in the network being unable to immediately transmit data. Factors related to network readiness for data transmission comprise the number of users attempting to transmit data, the volume of data being transmitted on the network, and/or the signal strength. Any or all of these factors may negatively impact a network's ability to immediately transmit data.

Although the elements of layer 2 carry out the bulk of tasks related to data transmission, the elements of layer 2 are not generally privy to the types of data that they are transmitting. Accordingly, the elements of layer 2 are generally incapable of distinguishing between priority data and non-priority data. Although elements of layer 2 may possess Quality of Service data that provide some information about the type of data being handled by layer 2, layer 2 is generally unable to reliably make appropriate decisions about how best to serve priority services. Where Layer 2 attempts to transmit data and receives a connection rejection and/or a wait timer in response, layer 2 will continue to attempt to transmit said data through repeated transmission requests. Typically layer 2 will continue the efforts at transmission until the transmission is successful or the retransmission count is expired.

According to one aspect of the Disclosure, the retransmission count may be 6, meaning that the UE would attempt up to 6 retransmissions before determining that the retransmission cannot proceed. According to another aspect of the Disclosure, the retransmission count may be 10. According to another aspect of the Disclosure, the retransmission count may be set to any integer, whether by the UE, the manufacturer, the network, or otherwise.

While retransmission is unsuccessfully attempted, the data transmission incurs latency. Where retransmission counts permit multiple retransmission attempts, the period of latency may span across the entire period of unsuccessful transmission. This is particularly likely where a NW rejects a connection request and provides a wait timer. Until at least expiration of the wait timer, a successful transmission over the NW is unlikely. Nevertheless, layer 2 will generally continue to reattempt transmission of data until either the retransmission count is exhausted, or the transmission is successful. This period of futile retransmission attempts during a wait timer is a period of latency. Although the resulting latency may have minimal undesirable effect on low-priority data, the latency may dramatically effect high-priority data, and even potentially cause the user experience to suffer greatly. This can lead to calls not being placed or calls in progress experiencing diminished quality or being dropped. For emergency calls, it may be especially important that said calls be placed in a timely manner. As such, it is useful to utilize an alternative method of transmission for priority data during a wait timer, to reduce latency for priority data.

According to one aspect of the Disclosure, the CSM identifies a high-priority data transmission; receives an RRC Connection Reject in response to an RRC Connection Request; and initiates an alternative transmission process for the high priority data transmission. The CSM receives priority information from layer 2, layer 3, other packet scheduling modules, and applications. The CSM assesses this information and identifies data with a low tolerance for latency, or data for which transmission is especially critical, such as an emergency call. This data then becomes priority data. Where the NW rejects efforts to transmit priority data, CSM can attempt to avoid the latency otherwise incurred in successive retransmission efforts by identifying alternatives methods of transmission during NW unavailability, and by instituting an alternative transmission process.

The alternative transmission process may comprise reducing the retransmission count for high-priority transmissions. Where a transmission attempt will be repeated multiple times before ultimately failing, and where each transmission attempt requires an amount of time to complete, a higher number of allowable retransmission attempts may negatively impact high-priority data, since the time required for the additional retransmission attempts may result in a negative user experience or call drop. As such, the CSM may calculate an appropriate number of potential retransmissions and restrict the retransmission attempts to this number by reducing the retransmission count. The CSM may reduce the retransmission count to a smaller integer, including zero. Upon unsuccessful completion of the number of retransmission attempts that corresponds to the retransmission count, the transmission will be deemed a permanent failure. The PDCP may transmit a notification of permanent failure to the PTM.

Where the CSM identifies priority data and adjusts the retransmission count to zero for said priority data, a permanent transmission failure will occur at least by the first failed transmission effort following the retransmission count being set to zero. This may minimize futile retransmission efforts by limiting retransmission attempts where the network is not available. For example, where the standard retransmission count is six, and the CSM sets a retransmission count for priority data to zero, as many as six retransmission efforts can be avoided. The resulting time savings translates into reduced latency for priority data. For data with low tolerance for latency, such as IMS call data, this may result in improved call clarity, fewer call drops, and increased user experience.

Where a permanent transmission failure has occurred, the CSM may order transmission of the high-priority data through an alternative means. The CSM identifies alternative means of transmission and can employ said alternative means of transmission to perform reduced-latency transmission of high-priority data. Said alternative transmission may comprise transmission through CS, Wi-Fi, a legacy RAT, or any other available means. The CSM is not limited to identifying CS, Wi-Fi, or a legacy RAT as the alternative means of transmission, but rather can select any method of transmission available. Where the transmission can be achieved through an alternative means of transmission during a period of network unavailability, the successful transmission may result in decreased latency. Once again, for data with low tolerance for latency, such as IMS call data, this may result in improved call clarity, fewer call drops, and increased user experience. Furthermore, the ability to successfully transmit priority data during a period of network availability is generally desirable, as it may result in earlier placement of emergency calls, more rapid delivery of application-crucial data, or otherwise.

Alternatively, the CSM may order retransmission of the data through the LTE network upon the expiration of the wait timer. This can be ordered, for example, where no alternative means of transmission is available. Where this strategy is employed with a reduced retransmission count or a retransmission count set to zero, this strategy may reduce latency by scheduling the retransmission effort over the network, when it is most likely to be effective. Additionally, this strategy improves efficiency by reducing or eliminating retransmission attempts where a wait timer is in place, since retransmission attempts before the expiration of the wait timer are unlikely to be successful.

The CSM may employ a combination approach that uses both the alternative transmission process via an alternative domain, as well as a retransmission through the network. This may be necessary, for example, where an alternative transmission domain (such as CS, Wi-Fi, or a legacy RAT) can be identified, but where transmission attempts on these alternative transmission domains are unsuccessful. In this case, upon expiration of the wait timer, the CSM may order resumed transmission efforts through the NW. It should be noted that where an alternative transmission domain is used in this Disclosure, the term alternative transmission domain is intended to mean any route of transmission other than the initial intended route. For example, where the initial route is a wireless cellular data transmission (such as LTE), the alternative transmission domain could comprise Wi-Fi, WLAN, a circuit switch fallback, bluetooth, or a legacy RAT.

The unavailability of the network may be temporary or permanent. Temporary causes of network unavailability may include, but are not limited to, the inability to provide necessary radio resources for the connection setup, network congestion, or overload of the NodeB or the eNodeB. Other reasons for network unavailability, which may be temporary or permanent, include, but are not limited to the cell or user equipment being barred from the network, the access class being barred during establishment of connection, the access class being barred for mo-signaling, and where access is barred for multimedia telephony (MMTel). Where the reason for network unavailability is temporary, the alternative transmission process through CS, Wi-Fi, legacy RAT, or otherwise, may permit continued transmission of priority data when network transmission is temporarily impossible. Once the network transmission is once again available, however, the CSM can then discontinue the alternative transmission process and then resume transmitting via the LTE network. This ability to utilize alternative methods to transmit priority data during temporary network unavailability, and then to resume transmission via the LTE network may minimize latency in time critical priority data. This minimized latency may be sufficiently small such that it cannot be identified by the end user. This minimized latency may be sufficiently small such that it does not noticeably impact the user experience or result in call drop.

The method of data transfer over a wireless mobile network may comprise receiving priority information related to a data transmission; assessing priority information to identify a priority data transmission; receiving an RRC Connection Reject in response to an RRC Connection Request for the priority data transmission; and instituting an alternative transmission process for the priority data transmission.

According to another aspect of the disclosure, the NAS may be an enhanced NAS or eNAS. The RRC may be an enhanced RRC or eRRC. A NodeB may be an enhanced NodeB or eNodeB.

According to one aspect of the disclosure, the method of data transfer over a wireless mobile network may be employed during initiation of priority data transmission, such as an IMS call. Where a connection request is sent to the NW and the NW is unavailable, the NW will typically reject the request and respond with a wait timer. Without the CSM, the UE would retransmit the connection request until exhaustion of the retransmission count or expiration of the wait timer. Where the transmission was unsuccessful at the end of the retransmission count, the transmission would fail. The user may have appreciated this as a failed attempt to place a voice call. With the CSM in place, however, the CSM may identify the priority data, such as the IMS voice call, and reduce or eliminate altogether retransmission attempts. Rather, the CSM may select an alternative transmission method to transmit the data.

According to another aspect of the disclosure, the method of data transfer over a wireless mobile network may be employed after a priority data transmission has already been established. This can occur where a priority data transmission, such as an IMS voice call, is ongoing, and the network becomes unavailable. Under this circumstance, the CSM may reduce or eliminate retransmission attempts and then order transmission of the priority data through an alternative transmission process.

An apparatus may perform the method for data transfer over a wireless mobile network. Such an apparatus may comprise a critical service manager, configured to receive priority information; a data plane, comprising at least one data plane module configured to provide priority information to the critical service manager; and a control plane, comprising at least one control plane module configured to provide priority information to the critical service manager; wherein in the critical service manager receives priority information related to a data transmission; assesses priority information to identify a priority data transmission; receives an RRC Connection Reject in response to an RRC Connection Request for the priority data transmission; and institutes an alternative transmission process for the priority data transmission.

According to one aspect of the disclosure, the CSM may be a software application. The CSM may operate outside of the commonly understood network layer structure and may therefore not be strictly confined to a given layer. The CSM may be located or stored on the user equipment.

According to another aspect of the disclosure, the CSM may regulate the transmission of priority data by setting the maximum number of retransmission attempts and/or by setting a maximum time limit for attempting retransmission. Under these methods, at the conclusion of the maximum number of attempted retransmissions or the maximum time limit for retransmissions, a transmission failure is deemed to have occurred.

The following Examples relate to additional embodiments or aspects of the Disclosure.

In Example 1, a method of data transfer over a wireless mobile network is disclosed, comprising:
receiving priority information related to a data transmission;
identifying a priority data transmission based on the priority information;
receiving a rejection in response to a connection request for transmission of the priority data transmission;
reducing, upon receiving the rejection, a number of attempts to retransmit the priority data transmission; and
transmitting the priority data transmission through an alternative transmission domain.

In Example 2, the method of Example 1 is disclosed, wherein the priority information comprises Packet Data Convergence Protocol data.

In Example 3, the method of Example 1 is disclosed, wherein the priority information comprises Quality of Service Class Identifier data.

In Example 4, the method of Example 1 is disclosed, wherein the priority information comprises Radio Line Control data.

In Example 5, the method of Example 1 is disclosed, wherein the priority information comprises Multiple Access Control Data.

In Example 6, the method of Example 6 is disclosed, wherein the priority information further comprises data received from the access-stratum.

In Example 7, the method of Example 6 is disclosed, wherein the priority information further comprising layer 3 data from the non-access-stratum.

In Example 8, the method of Example 10 is disclosed, wherein the priority information received from the non-access-stratum further comprises data received from the network service access point identifier.

In Example 9, the method of Example 1 is disclosed, further comprising the priority information being received from layer 2, received from layer 3, received from an application, or being any one of Packet Data Convergence Protocol data, Quality of Service Class Identifier data, Radio Link Control data, or Multiple Access Control data.

In Example 10, the method of Example 1 is disclosed, wherein the priority information further comprises data for other packet scheduling modules or applications.

In Example 11, the method of Example 11 is disclosed, wherein the priority information further comprises IMS call status.

In Example 12, the method of Example 12 is disclosed, wherein priority information further comprises available transmission domains.

In Example 13, the method of Example 6 is disclosed, wherein the priority information further comprises data from applications is disclosed, wherein said applications designate data transmissions as priority transmissions.

In Example 14, the method of Example 1 is disclosed, wherein the priority information further comprises data from layer 3.

In Example 15, the method of Example 1 is disclosed, wherein the priority information further comprises data from layer 2.

In Example 16, the method of Example 15 is disclosed, wherein the elements of layer 2 are generally unable to reliably make appropriate decisions about how best to serve priority services.

In Example 17, the method of Example 1 is disclosed, wherein the wireless mobile network employs multi-layered architecture.

In Example 18, the method of Example 17 is disclosed, wherein the multi-layered architecture is an OSI Model.

In Example 19, the method of Example 1 is disclosed, wherein the control plane receives priority information.

In Example 20, the method of any of Examples 1 to 19 is disclosed, wherein the Critical Service Manager ("CSM") assesses the priority information to identify a priority transmission.

In Example 21, the method of Example 1 is disclosed, wherein the priority data transmission is one of an Internet Protocol Multimedia Subsystem ("IMS") voice call, an IMS video call, or an emergency call.

In Example 22, the method of Example 1 or 21 is disclosed, wherein the priority data transmission is an MO MMTEL voice call (Ref3GPP TS 24.173).

In Example 23, the method of Example 1 or 21 is disclosed, wherein the priority data transmission in a MO MMTEL video call (Ref3GPP TS 24.173).

In Example 24, the method of Example 1 or 21 is disclosed, wherein the priority data transmission in an MO SMSoIP (Ref3GPP TS 24.173).

In Example 25, the method of Example 1 is disclosed, wherein a Critical Service Manager determines whether a transmission is a priority data transmission.

In Example 26, the method of Example 1 is disclosed, wherein a user equipment determines that a data transmission is a priority data transmission (ref 3GPP 24301, 3GPP TS 24.368, 3GPP TS 31.102).

In Example 27, the method of Example 1 or 26 is disclosed, further comprising an override function in the user equipment, to designate a transmission as a priority data transmission.

In Example 28, the method of Example 1 or 26 is disclosed, further comprising an override function in a terminal mobile communications device, to designate a transmission as a priority data transmission.

In Example 29, the method of Example 1, whereby the priority data transmission is an emergency call.

In Example 30, the method of Example 1 or 20 is disclosed, wherein a Critical Service Manger deems a transmission to be a priority data transmission because of a risk of interruption or call drop where multiple unsuccessful retransmission attempts are made.

In Example 31, the method of Example 1 is disclosed, wherein the connection request is a Radio Resource Control ("RRC") Connection Request.

In Example 32, the method of Example 1 is disclosed, wherein the rejection is an RRC Connection Reject.

In Example 33, the method of Example 31 is disclosed, wherein the RRC request reject is issued because of cell congestion.

In Example 34, the method of Example 32 or 33 is disclosed, wherein the RRC request reject is issued because the network cannot provide necessary radio resources for the connection setup.

In Example 35, the method of any one of Examples 32 to 34 is disclosed, wherein an RRC request reject is issued because the eNodeB is overloaded.

In Example 36, the method of any one of Examples 32 to 35 is disclosed, wherein the RRC request reject is issued because the cell is barred.

In Example 37, the method of Example 36 is disclosed, wherein the RRC request reject is issued because the access class is barred during the call establishment.

In Example 38, the method of Example 36 or 37 is disclosed, wherein access is barred for mo-signaling.

In Example 39, the method any one of Examples 36 to 38 is disclosed, wherein access is barred for multimedia telephony (MMTel).

In Example 40, the method of Examples 1 or 31 is disclosed, wherein data received from the access-stratum further comprises a rejection cause.

In Example 41, the method of Example 40 is disclosed, wherein the access-stratum data further comprises a wait timer.

In Example 42, the method of Example 1 or 31 is disclosed, wherein RRC request reject is issued because the RAT is unavailable for a specified period of time.

In Example 43, the method of Example 1 is disclosed, further comprising a user equipment receiving a wait timer in response to a connection request for transmission of the priority data transmission is disclosed, wherein the wait timer indicates a period of time during which a network will not accept the connection request.

In Example 44, the method of Example 1 or 44 is disclosed, wherein a wait timer is received in response to a connection request for transmission of the priority data transmission.

In Example 45, the method of Example 1 or 32 is disclosed, wherein the RRC connection reject includes a wait timer.

In Example 46, the method of Example 43 is disclosed, wherein the wait timer introduces a period of latency after the RRC connection reject.

In Example 47, the method of Example 43 or 46 is disclosed, wherein the latency increases the likelihood of a dropped call.

In Example 48, the method of Example 47 is disclosed, wherein the latency results in a dropped call.

In Example 49, the method of Example 47 is disclosed, wherein the latency results user-perceived breaks, pauses, noise, or other undesirable interruptions from a voice call.

In Example 50, the method of Example 47 is disclosed, wherein the latency results in user dissatisfaction.

In Example 51, the method of Example 43 is disclosed, further comprising the wait timer expiring; ceasing transmitting the priority data transmission via the alternative transmission domain; and transmitting a remainder of a priority data transmission over the wireless mobile network.

In Example 52, the method of Example 1 is disclosed, further comprising a critical service manager that assesses priority information to identify a priority data transmission.

In Example 53, the method of Example 52 is disclosed, wherein the CSM is software.

In Example 54, the method of Example 52 is disclosed, wherein the CSM is a logical circuit or apparatus.

In Example 55, the method of Example 1 or 52 is disclosed, wherein a critical service manager deems a transmission to be priority data transmission due to a software application first classifying the transmission as a priority data transmission.

In Example 56, the method of any one of Examples 1 or 52 to 55 is disclosed, further comprising the CSM declaring a permanent transmission failure in response to a connection reject.

In Example 57, the method of any one of Examples 1 or 52 to 56 is disclosed, further comprising the Critical Service Manager reducing the retransmission count for a priority data transmission.

In Example 58, the method of any one of Examples 1 or 52 to 56 is disclosed, further comprising the Critical Service Manager setting the retransmission count for a priority data transmission to zero.

In Example 59, the method of any one of Examples 1 or 52 to 56 is disclosed, further comprising the Critical Service Manager ceasing retransmissions for a priority data transmission.

In Example 60, the method of Example 57 or 58 is disclosed, further comprising the Critical Service Manager selecting a number of reduced retransmission attempts based on the delay tolerance of the data transmission.

In Example 61, the method of any one of Examples 1 or 52 to 59 is disclosed, further comprising the critical service manager identifying an alternative transmission domain for the priority data transmission.

In Example 62, the method of Example 1 or 61 is disclosed, further comprising the CSM determining an alternative domain for a data transmission.

In Example 63, the method of Example 1, 61, or 62 is disclosed, wherein the alternative transmission domain comprises transmission via a circuit switch fallback, a Wi-Fi connection, or a legacy radio access technology connection.

In Example 64, the method of Example 57 or 58 is disclosed, wherein the CSM selects the number of retransmission attempts to prevent unacceptable latency levels.

In Example 65, the method of Example 1 or 58 is disclosed, wherein the CSM declares a permanent transmission failure.

In Example 66, the method of Example 1 is disclosed, wherein the CSM determines that no alternative transmission domains are available.

In Example 67, the method of Example 66 is disclosed, wherein the CSM resumes attempts at retransmission through the wireless mobile network.

In Example 68, the method of Example 66 or 67 is disclosed, wherein the CSM resumes retransmission upon the expiration of the wait timer.

In Example 69, the method of Example 66 or 67 is disclosed, wherein CSM orders transmission over a wireless mobile network upon expiration of the wait timer.

In Example 70, the method of any one of Examples 1 or 66 to 68 is disclosed, wherein the discontinuation of retransmission until the end of the wait time reduces energy consumption.

In Example 71, the method of Example 1 or 63 is disclosed, wherein a temporary transmission of a priority data transmission pursuant to an alternative transmission domain avoids call drop.

In Example 72, the method of Example 1 or 63 is disclosed, wherein a temporary transmission of a priority data transmission pursuant to an alternative transmission domain avoids user-identifiable latency.

In Example 73, the method of Example 1 or 63 is disclosed, wherein transmission over a wireless mobile network resumes upon the network becoming available.

In Example 74, a means for transfer of priority data over a wireless mobile network is disclosed, wherein a critical service manager:
receives priority information related to a data transmission;
identifies a priority data transmission based on the priority information;
receives a rejection in response to a connection request for transmission of the priority data transmission;
reduces, upon receiving the rejection, a number of attempts to retransmit the priority data transmission, from a specified number; and
transmits the priority data transmission through an alternative transmission domain.

In Example 75, a means to transfer data over an alternative transmission domain is disclosed, wherein a computational circuit identifies a priority data transmission; receives a rejection in response to a connection request for transmission of the priority data transmission; reduces, in response to the rejection, a number of attempts to retransmit the priority data transmission; and transmits the priority data transmission through an alternative transmission domain.

In Example 76, an apparatus for data transfer over a wireless mobile network is disclosed, comprising:
a data plane circuit configured to provide priority information to a critical service manager;
a control plane circuit configured to provide priority information to the critical service manager;

and the critical service manager, configured to:
receive priority information related to a data transmission;
identify a priority data transmission based on the priority information;
receive a rejection in response to a connection request for transmission of the priority data transmission;
reduce, in response to the rejection, a number of attempts to retransmit the priority data transmission; and
transmit the priority data transmission through an alternative transmission domain.

In Example 77, the apparatus of Example 76 is disclosed, further comprising the critical service manager configured to identify a priority transmission based on information obtained from at least one of Packet Data Convergence Protocol data, Quality of Service Class Identifier data, Radio Link Control data, or Multiple Access Control data.

In Example 78, the apparatus of Example 76 is disclosed, wherein the alternative transmission domain comprises transmission via a circuit switch fallback, a Wi-Fi connection, or a legacy radio access technology connection.

In Example 79, an apparatus comprising a means to perform a method as claimed in any preceding claim.

In Example 80, machine-readable storage including machine-readable instructions, when executed, to implement a method or realize an apparatus as claimed in any preceding claim.

In Example 81, a non-transient computer readable medium, containing program instructions for causing a computer to perform the method of:
receiving priority information related to a data transmission;
identifying a priority data transmission;
receiving a rejection in response to a connection request for transmission of the priority data transmission;
selectively decreasing a retransmission count for the connection request for transmission of the priority data transmission; and
initiating an alternative transmission process for the priority data transmission.

In Example 82, a method of data transfer over a wireless mobile network is disclosed, comprising:
receiving priority information related to a data transmission; assessing priority information to identify a priority data transmission; receiving a wait timer from the wireless mobile network; selectively decreasing a retransmission count for the priority data transmission; identifying an alternative means to transmit the priority data transmission; and instituting an alternative transmission protocol for the priority data transmission.

In Example 83, the method of 82 is disclosed, wherein the alternative transmission protocol comprises a circuit switch fallback, a Wi-Fi connection, or a legacy radio access technology connection.

What is claimed is:

1. A method of data transfer over a wireless mobile network, comprising:
    receiving priority determination information related to a data transmission;
    classifying a data transmission as a priority data transmission based at least on the priority determination information;
    receiving a rejection in response to a connection request for transmission of the priority data transmission;
    reducing, upon receiving the rejection, a number of attempts to retransmit the priority data transmission; and
    transmitting the priority data transmission through an alternative transmission domain;
    further comprising a user equipment receiving a wait timer in response to a connection request for transmission of the priority data transmission; the wait timer expiring; ceasing transmitting the priority data transmission via the alternative transmission domain; and transmitting a remainder of a priority data transmission over the wireless mobile network, wherein the wait timer indicates a period of time during which a network will not accept the connection request.

2. The method of claim 1, wherein the priority data transmission is an emergency call.

3. The method of claim 1, further comprising receiving an override instruction from the user equipment to classify a transmission, not otherwise classified as a priority data transmission, as a priority data transmission.

4. The method of claim 1, wherein the data transmission is classified as a priority data transmission based on the priority determination information due to a risk of interruption or call drop from multiple unsuccessful retransmission attempts.

5. The method of claim 1, wherein the connection request is a Radio Resource Control ("RRC") Connection Request.

6. The method of claim 1, wherein the rejection is an RRC Connection Reject.

7. The method of claim 1, further comprising a user equipment receiving a wait timer in response to a connection request for transmission of the priority data transmission; the wait timer expiring; ceasing transmitting the priority data transmission via the alternative transmission domain; and transmitting a remainder of a priority data transmission over the wireless mobile network, wherein the wait timer indicates a period of time during which a network will not accept the connection request.

8. The method of claim 1, further comprising declaring a permanent transmission failure in response to a connection reject.

9. The method of claim 1, further comprising reducing the retransmission count for a priority data transmission.

10. The method of claim 9, further comprising setting the retransmission count for a priority data transmission to zero.

11. The method claim 9, further comprising ceasing retransmissions for a priority data transmission.

12. The method of claim 9, further comprising selecting a number of reduced retransmission attempts based on a delay tolerance of the priority data transmission.

13. The method of claim 1, further comprising identifying an alternative transmission domain for the priority data transmission.

14. The method of claim 13, wherein the alternative transmission domain is a circuit switch fallback, a Wi-Fi connection, or a legacy radio access technology connection.

15. The method of claim 13, further comprising over a wireless mobile network upon expiration of the wait timer.

16. An apparatus for data transfer over a wireless mobile network, comprising:
    a data plane circuit configured to provide priority determination information to a critical service manager;
    a control plane circuit configured to provide priority determination information to the critical service manager;
    and the critical service manager, configured to:
    receive priority determination information related to a data transmission;
    classify a data transmission as a priority data transmission based on at least the data plan and control plane information;

receive a rejection in response to a connection request for transmission of the priority data transmission;

reduce, in response to the rejection, a number of attempts to retransmit the priority data transmission; and transmit the priority data transmission through an alternative transmission domain;

further comprising a user equipment receiving a wait timer in response to a connection request for transmission of the priority data transmission; the wait timer expiring; ceasing transmitting the priority data transmission via the alternative transmission domain; and transmitting a remainder of a priority data transmission over the wireless mobile network, wherein the wait timer indicates a period of time during which a network will not accept the connection request.

17. The apparatus of claim 16, wherein the critical service manager is configured to classify a the data transmission as a priority data transmission based on information obtained from at least one of Packet Data Convergence Protocol data, Quality of Service Class Identifier data, Radio Link Control data, or Multiple Access Control data.

18. The apparatus of claim 16, wherein the alternative transmission domain is a circuit switch fallback, a Wi-Fi connection, or a legacy radio access technology connection.

19. The method of claim 1, wherein the priority determination information comprises a Quality of Service Class Identifier, and wherein the classification of a data transmission as a priority data transmission is based at least on the Quality of Service Class Identifier.

20. The method of claim 1, wherein the priority determination information comprises, and the classification of a data transmission as a priority data transmission is based on, at least one of Packet Data Convergence Protocol data, Radio Link Control data, and Multiple Access Control data.

21. The method of claim 1, wherein the priority determination information comprises Application Layer Data, and wherein the classification of a data transmission as a priority data transmission is based at least on the Application Layer Data.

22. The apparatus of claim 16, wherein the priority determination information comprises a Quality of Service Class Identifier, and wherein the Critical Service Manager classifies a data transmission as a priority data transmission based at least on the Quality of Service Class Identifier.

23. The apparatus of claim 16, wherein the priority determination information comprises at least one of Packet Data Convergence Protocol data, Radio Link Control data, and Multiple Access Control data and wherein the Critical Service Manager classifies the data transmission as a priority data transmission based at least on same.

24. The apparatus of claim 16, wherein the Critical Services Manager classifies the data transmission as a priority data transmission based at least on one of Bearer ID and Network Service Access Point Identifier.

\* \* \* \* \*